April 6, 1965   J. W. TAYLOR, JR   3,177,485
AUTOMATIC RADAR TARGET TRACKING SYSTEM
Filed March 2, 1960   4 Sheets-Sheet 1
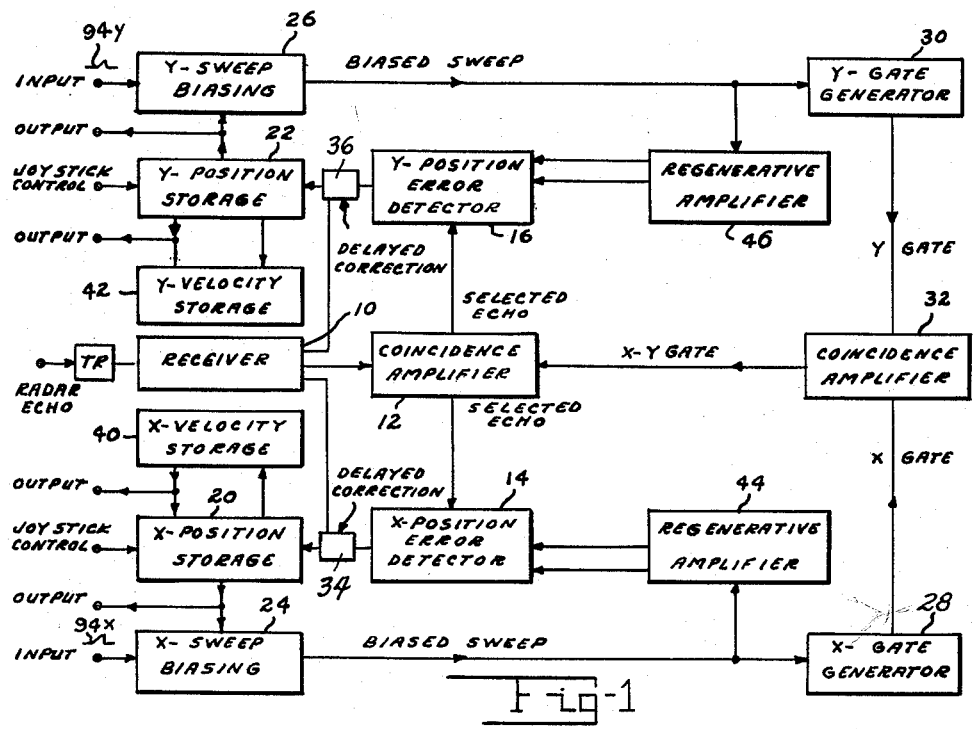
Fig-1
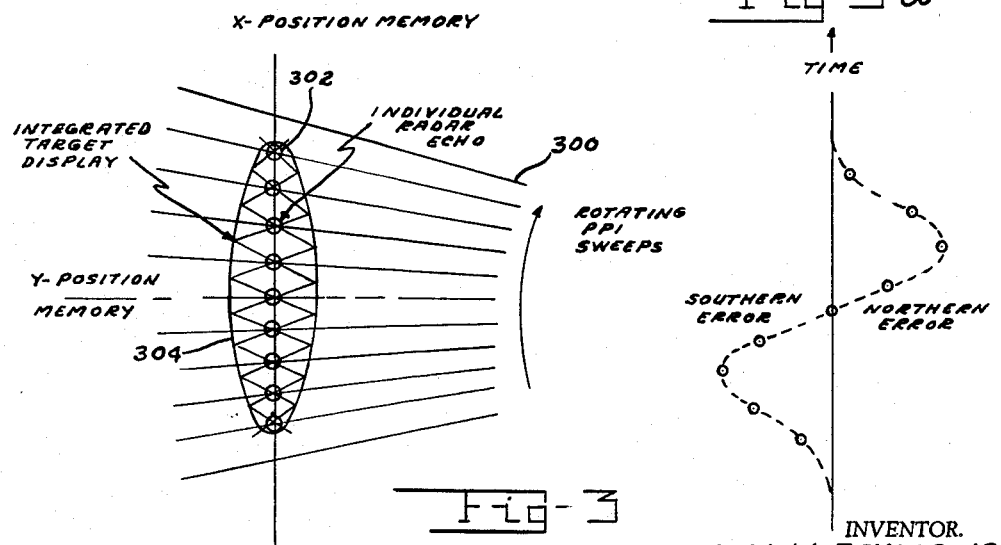
Fig-3
Fig-3a
INVENTOR.
JOHN W. TAYLOR, JR.
BY
ATTORNEYS

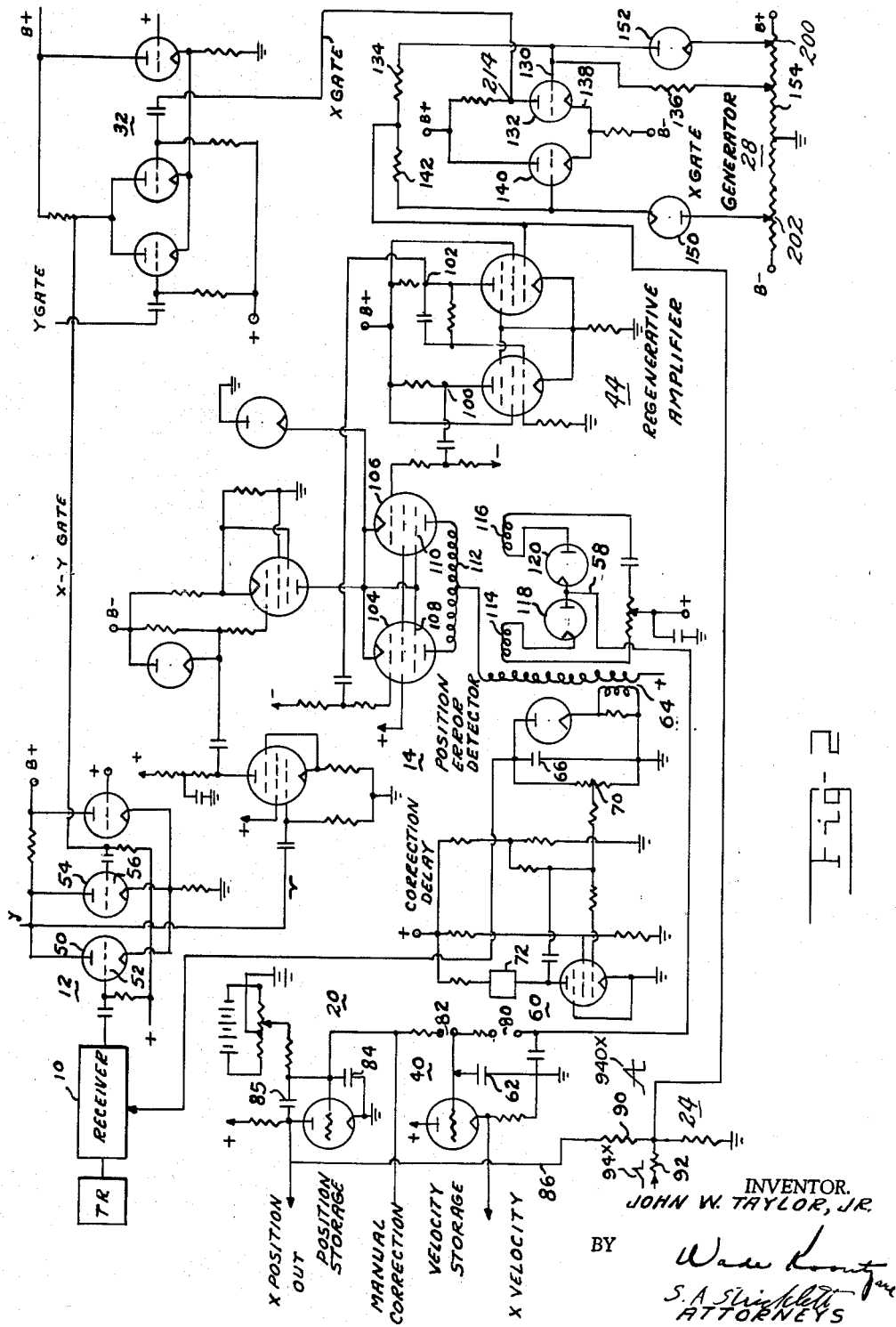

April 6, 1965     J. W. TAYLOR, JR     3,177,485
AUTOMATIC RADAR TARGET TRACKING SYSTEM Filed March 2, 1960     4 Sheets-Sheet 3

INVENTOR.
JOHN W. TAYLOR, JR.
BY
S.A. Stricklett
ATTORNEYS

United States Patent Office 3,177,485
Patented Apr. 6, 1965

3,177,485
AUTOMATIC RADAR TARGET TRACKING SYSTEM
John W. Taylor, Jr., Baltimore, Md., assignor, by mesne assignments, to the United States of America as represented by the Secretary of the Air Force
Filed Mar. 2, 1960, Ser. No. 12,484
1 Claim. (Cl. 343—7.3)

This invention relates to an automatic radar target tracking system and, particularly, to a tracking system in which the target is periodically contacted and utilizing Cartesian coordinate displays provides position coordinates of a tracked target.

Radar information as to the geographic location of targets basically is in polar form, that is, the bearing of the antenna at the time the echo is received and the range of the target as determined by the interval between transmission of the pulse and receipt of the echo. On the other hand, radar indicators are more commonly designed to accept Cartesian information, deflection of a cathode ray beam being accomplished by means of stationary orthogonal pairs of coils or electrostatic plates. Therefore both types of information are available for "automatic tracking" of a designated target.

One type of automatic tracking maintains the radar antenna always pointing at the target. A V-beam antenna is commonly used to detect a shift of the target off the axis of the antenna, and appropriate correction of the antenna bearing is made by a servo loop. A system of time gates is used to memorize the range of the target and eliminate from consideration by the tracking system all radar data which does not closely conform to the memorized range. Consequently, extraneous targets outside the beam width of the antenna or differing from the memorized range by too great a degree cannot confuse the tracking system. It accepts information only from targets within the polar boundaries of the limited geographical area.

An alternate automatic tracking system known as track-while-scan, allows the radar antenna to scan independently. The instantaneous information as to target location, obtained each time the antenna scans across the target, is memorized. A separate memory channel is required for each target and, in order to determine the proper channel in to which to place the latest data, the memory must agree with the recent information within defined limits. If agreement is not obtained, the data is rejected by that channel. The memory circuit tracks only the information which it considers may feasibly originate from its selected target, basing its decision on its own memory of that target's position.

Since the track-while-scan system supplies data on a given individual target relatively infrequently, memory of past geographic location must be modified by memory of past velocity. In the usual case of a target having constant velocity, the Cartesian components of this velocity also are constant, and hence, readily memorized. On the other hand, the polar components of velocity change with position of the target, the variation in changes becoming greater as the target approaches the radar location; under such conditions, memory is poor. For this reason, tracking in Cartesian coordinates is to be preferred for track-while-scan systems.

Accordingly, this invention provides a system for utilizing the Cartesian coordinates of the target display to provide biased voltages to maintain the radar system responsive to target echoes from a particular geographic location in which the tracked target is located.

In the construction according to the invention, memories of a target location provide gates for permitting the passage of target echoes during the operation of the gates. These echoes are fed to position error detectors which provide an error voltage proportional to the velocity of the target motion in both the $x$ and $y$ coordinates. The voltage corresponding to the velocity is added to the original position to provide a new position memory which biases the sweep impulse so that the $x$ and $y$ gates will vary with the position of the target so that the periodic sweep of the radar will transmit to the position error detectors only the echoes of that particular target at all times.

Heretofore considerable difficulty has been encountered because the gates have been dependent on the direction of the velocity correction and, accordingly, a gate generator is provided which is independent of the direction of the correction voltage and provides a yes or no gate which will be on or off according to the absolute voltage regardless of whether the voltage is going from high to low or from low to high.

This gate generator is constructed as a differential amplifier in which change of input voltage in a predetermined range will produce little or no change in output voltage while any change outside the range of acceptance voltage produces an extremely rapid change of output voltage.

It is, accordingly, an object of the invention to provide a radar tracking system for a track-while-scan system.

It is another object of the invention to provide a tracking system having initial bias voltages corresponding to the Cartesian coordinates of a target display.

It is a further object of the invention to provide a tracking system in which the velocity of the target provides correction voltages for the position voltage of a memory system.

It is a further object of the invention to provide a tracking system responsive to a biased sweep for receiving echoes from a predetermined region.

It is another object of the invention to provide a gate generator responsive to a predetermined voltage range.

It is a still further object of the invention to provide a gate generator not responsive to direction of voltage change.

Other objects and advantages of the invention will be apparent from the following detailed description taken in conjunction with the accompanying drawings in which:

FIG. 1 is a block diagram of an automatic Cartesian coordinate tracking system;

FIG. 2 is a wiring diagram of one form of circuitry for the blocks of FIG. 1;

FIG. 3 is a diagram of successive radar echoes from a single target because of antenna beam width;

FIG. 3a is a graphic presentation of the instantaneous output of the position error detector.

Figure 4:
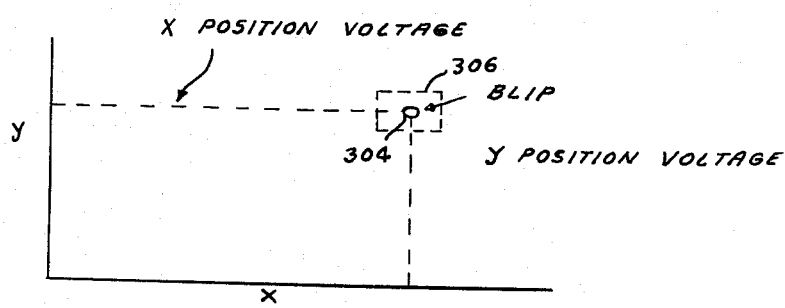
FIG. 4 is a diagram of a portion of a Cartesian presentation showing the $x$ and $y$ coordinates.

In the exemplary embodiment according to the invention, a tracking system includes a receiver 10 connected to receive a radar echo. The target echoes from the receiver 10 are fed to a coincidence amplifier 12 and when properly gated, the coincidence amplifier 12 supplies echo pulses to both the $x$ and $y$ position error detectors 14 and 16. The $x$ and $y$ coordinates of a selected target are fed into an $x$ storage 20 and a $y$ storage 22 by any suitable method such as a so-called joy stick locator in which a joy stick is moved to provide a coincidence with the radar pip which in turn selects an $x$ voltage and a $y$ voltage, equal respectively to the $x$ and $y$ coordinate sweep voltages at the target location, which are fed into the respective storages 20 and 22. $x$ Sweep control voltage $94x$ from the radar system is fed into the $x$ sweep biasing system 24 and the $y$ sweep control voltage $94y$ from the radar system is fed into the y sweep biasing system 26. The sweep biasing systems bias the pulses 94x and 94y by the potentials stored in the respective position storages 20 and 22 so that a biased sweep is fed to an x gate generator 28 and a biased sweep is fed to a y gate generator 30, the construction of which will be presently described. The x and y gate generators 28 and 30 then provide x and y gates which are supplied to a coincidence amplifier 32 which, as shown in FIG. 2, may be a simple AND gate, however, any suitable coincidence amplifier may be used.

The coincidence amplifier 32 when activated by both the x and y gates provides an x–y gate which is applied to the coincidence amplifier 12 which in turn supplies the echo pulses to the x position error detector and the y position error detector, each of which provides an output position error voltage proportional to the velocity or apparent position error of the echo from the target. This output voltage is stored in an x velocity storage 40 and a y velocity storage 42 during the interval of transmission of echoes from the receiver 10 through the coincidence amplifier 12 to the position error detectors 14 and 16. Likewise, the amplitude of the error signal provides gain control signals which are returned to the receiver 10 to control the gain of the receiver 10. Delay correction devices 34 and 36 are utilized to be responsive to the output of the position error detectors 14 and 16 so that when the echo signal is discontinued to the position error detectors 14 and 16 the velocity potential in the velocity storages 40 and 42 will be transmitted to the respective position storages to provide new position voltages indicating the corrected position of the target. In order to provide a positive determination of the position error the regenerative amplifiers 44 and 46, controlled by the biased sweep pulses, provide an output control potential applied in push-pull relation to the position error detectors 14 and 16 so that each error detector will be switched by the push-pull control potential so as to separate the target echoes into early and late time elements with respect to the predicted target position.

While any suitable circuitries may be utilized for each of the components shown in FIG. 1, the circuit diagram of FIG. 2 shows well known arrangements substituted for each of the components other than the gate generators 28 and 30. The gate generators are shown as an improved voltage acceptance circuit presently to be described. The receiver 10 may obviously be of any of the well known devices. The coincidence amplifier 12 is an amplifier AND gate having a first tube 50 including a grid 52 controlled by the echo signal and a second tube 54 having a grid 56 controlled by the x–y gate so that when there is coincidence between the echo and the x–y gate, the echo impulses will be supplied to the x position error detector 14 and the y position error detector 16. The error position detectors 14 and 16 are of the well-known type shown in FIGS. 8–32, page 315, vol. 20 of Massachusetts Institute of Technology Radiation Laboratory Series, first edition. The x error detector 14 has the output 58 connected through a contact 80 of relay 60 to a velocity storage capacitor 62. A transformer 64 is responsive to the intensity of the echo to provide a voltage on capacitor 66 which is supplied to the receiver 10 to control the gain of the receiver 10. The voltage of the capacitor 66 is likewise connected across a voltage divider 70 to control the current through a winding 72 of the relay 60 so that when current is found in the transformer 64 the relay contact 80 will be closed so that the error potential will be applied to the capacitor 62 and when the current ceases through transformer 64, the relay winding 72 will be deenergized opening relay contact 80 and closing contact 82 to transfer the charge stored in the capacitor 62 to the storage capacitor 84 to provide a position storage voltage. The position storage voltage of capacitor 85 is fed over conductor 86 to the sweep biasing device 24 including the resistance 90 and an input impedance 92 so that the sweep 94x will be biased by the potential of the position storage voltage. The biased sweep 940x supplied to the regenerative amplifier 44 to provide outputs at terminals 100 and 102 which control the operation of the tubes 104 and 106 in push-pull relation so that the echo applied to the cathodes and the grids 108 and 110 of the tubes 104 and 106 control the conduction of the tubes in such manner as to control the direction of current flow through the primary 112 of the transformer having the output secondaries 114 and 116 which determine the conduction of output tubes 118 and 120 and consequently the polarity of the error voltage on the output connection 58.

The biased sweep 940x is likewise supplied to the gate generator 28 which provides one of the gates for controlling the coincidence amplifier 32 which is constructed in a manner substantially identical to the coincidence amplifier 12 or any other suitable coincident gate.

In order to improve the influence of the position of the x and y gates on the polarity of the correction applied to the x and y position storage devices 22 and 24 and hence to the biasing of the x and y sweeps 94x and 94y, a positive yes and no circuit has been utilized. This circuitry presents an output voltage which is one of two values, determined by the extent by which the input voltage deviates from a desired level. One of the two possible output voltages indicates that the input voltage is within defined limits; the other, that the input is either too high or too low. Hereafter, these outputs will be referred to as "acceptance voltage" and "rejection voltage" respectively.

One use of such a device is for automatic rejection of unsuitable products, automatic quality control. The characteristic of the product, control of which is desired, is transformed by suitable measurement equipment into a D.C. voltage. When this D.C. voltage is connected to the input of the device herein described, the output may be made to control a relay or other mechanical device to separate acceptable products from those exceeding the designated limits.

Such a separation function is commonly employed with existing equipment. However, where a continuously varying characteristic is being monitored, most such devices suffer from the dependency of the limit value on the direction from which the limit is approached. The characteristic, when varying, normally causes a proportional variation in voltage; however, the voltage at which a relay will shift depends upon whether it is actuated or deactuated at the time.

The present circuit does not suffer from this faulty memory, because the output voltage, which can be used for a gate, shifts very rapidly as the input voltage passes the permissible limit and is independent of direction of approach.

Basically the device is a differential amplifier whose inputs are identical so long as they are within the acceptability range. Changes of input voltage within this range produce little or no change in output voltage. However, should the input voltage pass the acceptability limit, one of the input channels is restrained from accepting this change. The other input channel, being unrestrained, causes a differential input condition which produces a rapid change in output voltage. Further drifting of the input voltage into the nonacceptable region quickly saturates the output voltage so that except for a narrow transition region, the output is a bivalued quantity indicative of acceptance or rejection.

Referring to FIG. 2, the biased input x-sweep voltage 940x is fed to the grid 130 of the differential amplifier tube 132 through a voltage divider composed of resistors 134 and 136 and to the cathode 138 through cathode follower 140 by way of resistor 142. The resistor 136 is to compensate both for the gain of the cathode follower 140 being less than unity and for the slight dependence of the output voltage on the cathode level. The result is an output voltage 214 at the plate of tube 132 which is constant over a wide range of input voltages so long as neither of the diodes 150 and 152 is conducting. These diodes 150 and 152 are connected to a voltage divider 154, whose resistance is low compared to resistors 134 and 142 at voltage levels 200 and 202 representing the limits of acceptability.

While the biased input x-sweep voltage 940x is within the limits 200, and 202, neither diode 150 or 152 is conductive, and the output 214 is constant as previously described. When the input x-sweep voltage 940x is below the lower voltage limit 202, diode 150 prevents the cathode 138 of the differential amplifier from following the decline. The grid 130 of tube 132, however, follows the input of the biased x-sweep voltage unimpeded and rapidly cuts off the tube 132.

A similar condition results when the biased x-sweep voltage input rises above the upper acceptance limit 200. The operation then is that the cathode of tube 132 follows the rise unhindered while the grid 130 is stopped by the conduction of diode 152. The effect is again a negative grid-to-cathode voltage to cut off tube 132.

Figure 5:
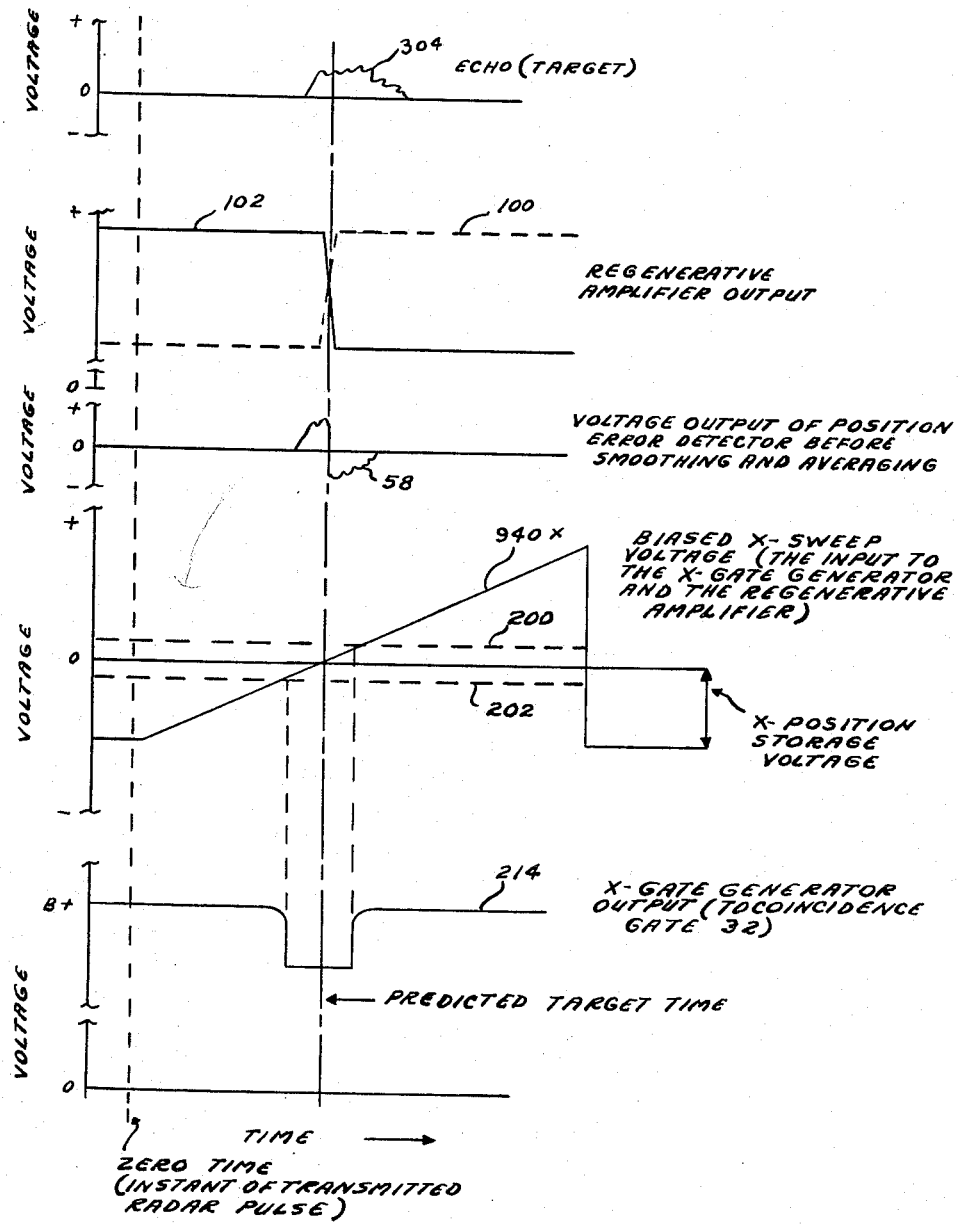
FIG. 5 is a graphic presentation of the manner of creating the primary gates, showing time relationships to other parts of the system.

FIG. 5 illustrates the relationship between a biased x-sweep input voltage 940x which varies linearly with time and the output voltage 214 from this circuit. Such represents the use for which this device was originally designed and indicates the basic property of the circuit, the rejection voltage's independence of whether the upper or the lower acceptability limit has been exceeded.

In the application shown in FIG. 2, the sawtooth input voltage 94x represents the East-West deflection of a PPI display, and the acceptability limits 200–202, the latitude limits of the geographic sector 306 from which the target information is desired. A similar circuit on the North-South deflection system produces longitude limits, and a combination of the two can be made to exclude all target echoes except those received from the desired geographic rectangle 306. This operation is necessary in an automatic tracking system in order that echoes other than the selected target will not influence the tracking circuitry.

A better understanding of the operation of the gate and the associated timing sequences will be had from the inspection of FIG. 5. The curves show the operation of various parts of the x coordinate tracking system with respect to time. The same time axis of abscissas applies to all the curves. The axis of ordinates are all arbitrary units of voltage. The dotted line just to the right of the axis of ordinates corresponds to the instant of transmission of the radar pulse. In radar terminology this is quite frequently referred to as "zero time." The second dotted line further to the right is the predicted target time. This predicted time is the measure of time interval between the transmitted radar pulse and the time at which the biased x coordinate sweep voltage 940x passes through zero potential. When the biased x coordinate sweep voltage will pass through zero is determined by the x-position storage voltage which in turn was established by the radar system from the previous scan, or in the case of the first scan, in automatic tracking, it was established by the positioning of the previously referred to joy stick. A target echo 304 is being tracked by the radar system. The time interval between the outgoing radar pulse and the predicted target time is shown to be nearly correct. The predicted time is a little early as shown by the area to the left of the predicted target time contained by echo curve 304 being slightly smaller than the area to the right. This is the condition for one echo return only. If the average of all the returns for this particular sweep of the target by the rotating antenna results in more returns being received late than early the x-sweep bias voltage will be changed by the x-position storage voltage being lowered (increased negatively) by the amount that the average of the returns differ from zero. Thus the predicted target time for the next scan of the target will be later in time. It is to be noted that in one sweep (scan) of the target by the antenna several returns will be received as shown in FIGURE 3a. Some returns, even for a perfectly centered target will, by the nature of the antenna beam pattern, be early and some will be late. The average over the scan is stored by the velocity storage circuit 40. The delay correction circuit 34 then transfers the velocity storage charge to the x-position storage 20 between target scanning intervals.

The outputs of the push-pull regenerative amplifier 44 are shown by square waves 102 and 100. The regenerative amplifier may be a conventional bistable multivibrator or flip-flop circuit. It is designed to switch as the biased x-sweep voltage passes through zero potential, i.e., at the predicted target time. Voltages 102 and 100 control the x-position error detector dividing the echo into that part occurring before predicted target time and that part occurring after predicted target time 58. As previously set forth, the difference in these two values will determine the x-position storage voltage.

The biased x-sweep voltage curve 940x has superimposed in dotted lines the voltage potentials 200 and 202 which determine the output of the x-gate generator 214. The gate is in the form of a negative-going square wave of voltage with time of gate initiation determined by the time of intersection of potentials 940x and 202 and time of termination determined by the intersection of potentials 940x and 200.

The foregoing description of FIG. 5 refers to the x-sweep system of the disclosed radar system. A similar system is used for the y-sweep system. It is through the combined action of both the biased x-sweep and the biased y-sweep, as the coordinate display sweeps sweep positively and negatively covering all four quadrants, that, for one value of x-bias voltage combined with one value of y-bias voltage, one particular location in planar space is defined.

In the operation of the system, the latter will scan the target area and a plurality of radar pulses 300 will strike the target at various positions as shown in FIG. 3. Each of these pulses will produce an individual radar echo 302 and as the plurality of radar pulses 300 will be reflected consecutively, the echoes 302 will apparently come from spaced apart positions in space because of the angle between successive pulses 300, and in order to track the center of the target, the individual echoes 302 will be integrated to provide a blip 304 as seen on the Cartesian screen indicated in FIG. 4 and the extent of the gate will produce the area 306 in which the target must be noted and the echoes 302 would be passed. As seen in FIG. 3a, the echoes 302 from the first return pulses or echoes 302 will produce an error herein indicated as a southern error although it could be ± as desired with the central echo being substantially in the center of the blip 304 and the last pulses produce echoes with an opposite direction of error so that in order to secure coincidence with the center of the blip the output error of the position error detector is fed to the capacitor 62 which will average the position returns to give a proper charge on capacitor 62 which will then be transferred to the position storage to provide the correct position voltage for biasing the y-sweep voltage 94y. It will thus be seen that the blip 304 will be positively centered in the area from which returns will be accepted and the system will positively follow the place in space of the target regardless of the direction of target motion in any coordinate.

For purposes of exemplification, a particular embodiment of the invention has been shown and described according to the best present understanding thereof. However, it will be apparent to those skilled in the art that many modifications and arrangements thereof may be resorted to without departing from the true spirit and scope of the invention.

I claim:

In a radar system having a directional antenna scanning at a constant angular velocity in the horizontal plane with an angle resolving system cooperating with said rotating antenna to transform the range sweep voltage into $x$ and $y$ coordinate sweep voltages in accord with the position of the antenna, said $x$ and $y$ coordinate sweep voltages being positive and negative in magnitude with zero potential representing origin of rectangular coordinates and said $x$ and $y$ coordinate sweep voltages cooperating with a Plan-Position-Indicator to display in rectangular coordinates area swept by the radar system and display in said coordinates targets located by said radar system, each target being a plurality of echo returns defining a sector of each rotational sweep of said antenna, also having, a sawtooth voltage generator generating aforesaid range sweep, a radar receiver communicating target echoes to said PPI display system, the improvement providing an automatic target tracking-while-scanning system comprising: a target selecting means having voltage outputs in $x$ and $y$ coordinate form, equal in magnitude to said $x$ and $y$ sweep voltages respectively at the position of selected target; $x$-position storage means and $y$-position storage means storing said respective voltage outputs from said target selection means; $x$-sweep biasing means and $y$-sweep biasing means providing a biased $x$ coordinate sweep and a biased $y$ coordinate sweep respectively by subtracting said stored $x$ and $y$ position voltages from said $x$ and $y$ coordinate sweep voltages respectively resulting in respective displaced coordinate sweep voltages with respect to said zero potential voltage; an $x$-gate generator means and a $y$-gate generator means generating respective time interval gates of predetermined widths cooperating with the output of said $x$-sweep biasing means and with the output of said $y$-sweep biasing means respectively to center said gates in time with respect to the time at which said respective $x$ and $y$ biased coordinate sweeps pass through zero voltage potential; a first coincidence amplifier means cooperating with said $x$-gate generator and said $y$-gate generator to provide an $x$–$y$ gate output during time of coincidence of said $x$ gate and said $y$ gate; a second coincidence amplifier means cooperating with said first coincidence amplifier means and said radar receiver, providing as an output the output of said receiver during time interval of said $x$–$y$ gate; a first regenerative amplifier means having a first and a second square-wave type output in push-pull switch arrangement, said regenerative amplifier means cooperating with said biased $x$ coordinate sweep to effect said switch from said first square-wave output to said second square-wave output as said biased $x$ coordinate sweep passes through zero potential voltage during said biased $x$ coordinate sweep; a second regenerative amplifier means having a first and a second square-wave type output in push-pull switch arrangement, said regenerative amplifier means cooperating with said biased $y$ coordinate sweep to effect said switch from said first square-wave output to said second square-wave output as said biased $y$ coordinate sweep passes through zero potential voltage during said biased $y$ coordinate sweep; an $x$-position error detector means cooperating with the output of said second coincidence amplifier means and said first and said second square-wave outputs of said first regenerative amplifier providing an output proportional to the difference in the amount of output from said second coincidence amplifier occurring during said first square-wave output of said first regenerative amplifier and the amount of output from said second coincidence amplifier occurring during said second square-wave output of said first regenerative amplifier, the polarity of said difference being a positive value when the larger amount of the output of said second coincidence amplifier occurred during said first square wave and the polarity of said difference being a negative value when the larger amount of the output of said second coincidence amplifier occurred during said second square wave; a $y$-position error detector means cooperating with the output of said second coincidence amplifier means and said first and said second square-wave outputs of said second regenerative amplifier providing an output proportional to the difference in the amount of output from said second coincidence amplifier occurring during said first square-wave output of said second regenerative amplifier and the amount of output from said second coincidence amplifier occurring during said second square-wave output of said second regenerative amplifier, the polarity of said difference being a positive value when the larger amount of the output of said second coincidence amplifier occurred during said first square wave and the polarity of said difference being a negative value when the larger amount of the output of said second coincidence amplifier occurred during said second square wave; a first delay correction means cooperating with the output of said $x$-position error detector means providing an output at the cessation of said echo returns from said sector of rotational sweep of said antenna, and said first delay correction means having amplitude gain control means cooperating with said receiver to maintain voltage amplitude of said echo returns essentially constant; a second delay correction means cooperating with the output of said $y$-position error detector means providing an output at the cessation of said echo returns from said sector of rotational sweep of said antenna, and said second delay correction means having amplitude gain control means cooperating with said receiver to maintain voltage amplitude of said echo returns essentially constant; an $x$-velocity storage means cooperating with the output of said $x$-position error detector means and said first delay correction means having an output proportional to the algebraic sum of said outputs of said $x$-position error detector from each scanning of said sector during rotational sweep of said antenna; a $y$-velocity storage means cooperating with said $y$-position error detector means and said second delay correction means having an output proportional to the algebraic sum of said outputs of said $y$-position error detector from each scanning of said sector during rotational sweep of said antenna; a first transfer means cooperating with the output of said $x$-velocity storage means and said output of first delay correction means algebraically adding said output of velocity storage means to said $x$-position storage means whereby output of said $x$-position storage means is adjusted to provide a potential to said $x$-sweep biasing means that will cause said biased $x$ coordinate sweep to traverse zero potential voltage in accord with said target position of last previous scan of said antenna; and a second transfer means cooperating with the output of said $y$-velocity storage means and said output of second delay correction means algebraically adding said output of velocity storage means to said $y$-position storage means whereby output of said $y$-position storage means is adjusted to provide a potential to said $y$-sweep biasing means that will cause said biased $y$ coordinate sweep to traverse zero potential voltage in accord with said target position of last previous scan of said antenna.

References Cited by the Examiner

UNITED STATES PATENTS

| | | | |
|---|---|---|---|
| 2,573,840 | 11/51 | Grass | 343—7.3 |
| 2,709,804 | 5/55 | Chance et al. | 343—7.3 |
| 2,773,981 | 12/56 | Goodall | 328—150 |
| 2,774,964 | 12/56 | Baker et al. | 343—7.3 |
| 2,878,326 | 3/59 | Cope | 328—150 |
| 2,924,818 | 2/60 | White | 343—7.3 |
| 2,995,744 | 8/61 | Covely et al. | 343—7.3 |
| 3,050,722 | 8/62 | Covely | 343—11 |

CHESTER L. JUSTUS, *Primary Examiner.*